(12) United States Patent
Müller

(10) Patent No.: US 6,824,376 B2
(45) Date of Patent: Nov. 30, 2004

(54) ARRANGEMENT FOR A CONTINUOUS TWO-STAGE EJECTOR OF THE BUILT-IN TYPE

(76) Inventor: Hans Müller, Pejlingsvägen 6, Frufällan (SE), SE-506 70

( * ) Notice: Subject to any disclaimer, the term of this patent is extended or adjusted under 35 U.S.C. 154(b) by 30 days.

(21) Appl. No.: 10/179,737

(22) Filed: Jun. 25, 2002

(65) Prior Publication Data

US 2003/0211196 A1 Nov. 13, 2003

(30) Foreign Application Priority Data

May 8, 2002 (SE) ............................................. 0201402

(51) Int. Cl.[7] ........................... B29C 43/50; B29C 45/40
(52) U.S. Cl. ........................ 425/236; 425/422; 425/443; 425/556
(58) Field of Search ............................... 425/236, 351, 425/422, 441, 443, 444, 556

(56) References Cited

U.S. PATENT DOCUMENTS 3,049,758 A * 8/1962 Drevalas ..................... 425/438
3,534,443 A * 10/1970 Tucker ........................ 425/443
4,239,174 A * 12/1980 Muller et al. ................. 249/67
5,011,398 A * 4/1991 VanRens ..................... 425/444
6,042,363 A * 3/2000 Kikuchi ...................... 425/556
6,179,606 B1 * 1/2001 Muller ....................... 425/556
6,379,072 B1 * 4/2002 Brown et al. ................. 403/31

* cited by examiner

Primary Examiner—Benjamin L. Utech
Assistant Examiner—Emmanuel S. Luk
(74) Attorney, Agent, or Firm—Orum & Roth

(57) ABSTRACT

The arrangement is based on the principle that the ejector (9) of a moulding tool actuates the front ejector plates (4, 4A, 4B) and the rear plates (5, 5A, 5B) are conveyed along until the bearing segments reach the free groove in the central pin, which at the same time is provided with a stroke-restricting collar (20), in conjunction with which balancing against misalignment of the ejector package is obtained at the same time through the incorporation of this two-stage ejector, and, at the same time, that it replace extra guides.

9 Claims, 6 Drawing Sheets

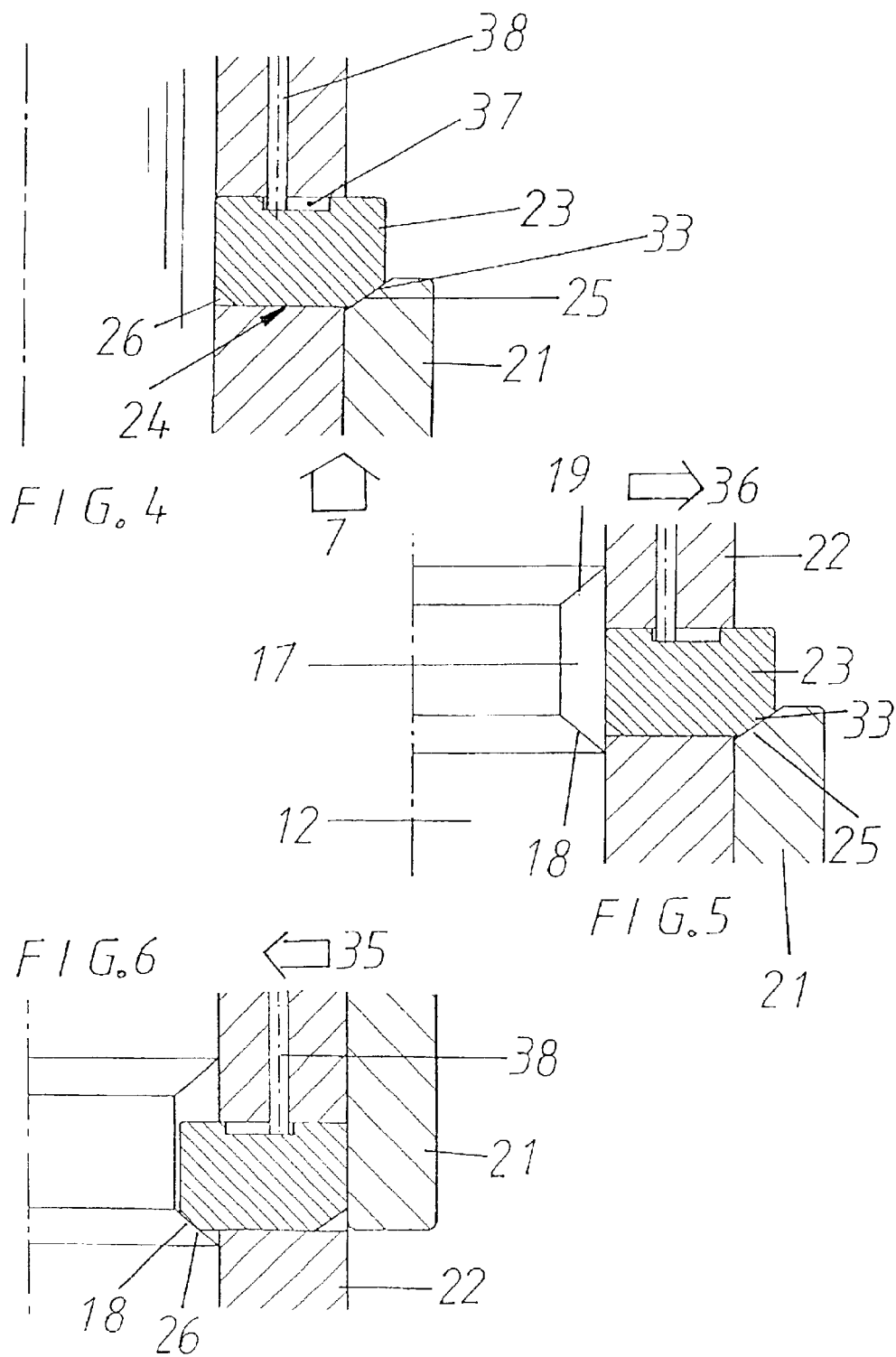

ARRANGEMENT FOR A CONTINUOUS TWO-STAGE EJECTOR OF THE BUILT-IN TYPE

BACKGROUND OF THE INVENTION

1. Field of the Invention

The present invention relates to an arrangement for a continuous two-stage ejector of the built-in type for moulding tools comprising pairs of front and rear moving ejector plates and an actuating device for causing the aforementioned ejector plates to be moved to intended positions.

2. Description of Related Art

Previously disclosed two-stage ejectors of the kind that are intended for building-in are designed as a rule so that a bridge part, which is attached between ejector plates of the kind in question, runs in a slotted guide and stop sleeve and constitutes the basis for the two-stage function. Bridge parts of this kind and long sleeve parts that are slotted are expensive to manufacture and are difficult to build into the tool in question. The previously disclosed two-stage ejectors must also be secured against rotation with rotation-preventing means, which increases the cost.

BRIEF SUMMARY OF THE INVENTION

The principal object of the present invention is,

In the first instance, to attempt to solve the aforementioned problems by simple and reliably functioning means in conjunction with a moulding machine essentially for the manufacture of plastic components, but also for metal-forming machines.

The aforementioned object is achieved by means of an arrangement in accordance with the present invention, which is characterized essentially in that front ejector plates are attached to, and are capable of actuation by, a reciprocating rod that is connected to the machine, in that a central pin extends between the fixed plate of the moulding tool and the body of the moulding tool, in that the aforementioned central pin exhibits an annular groove at a distance from a projection on the aforementioned central pin, in that pairs of sleeves are accommodated by the aforementioned central pin with one sleeve passed onto the other sleeve, in that each of the two sleeves is attached to its own moving ejector plate, in that the inner sleeve exhibits transcurrent recesses corresponding to the desired number of locking segments, in that the outer sleeve exhibits a stop part capable of actuating the aforementioned locking segments, in that the aforementioned locking segments exhibit accommodating parts capable of interacting with the aforementioned grooves, in that extension of the first sleeve is restricted by the projection, in conjunction with which the ejector of the moulding tool is so arranged in an initial phase as to actuate the front ejector plates and so that the rear ejector plates are conveyed along through the interconnection of the two sleeves with the help of the locking segments, and in that, after actuation of the locking segments and their accommodation in the aforementioned annular groove, the rear ejector plates are released and the front ejector plates are so arranged as to be actuated singly by the ejector causing them to be extended to the intended end position.

BRIEF DESCRIPTION OF THE SEVERAL VIEWS OF THE DRAWINGS

The invention is described below as a number of preferred illustrative embodiments, in conjunction with which reference is made to the accompanying drawings, in which:

FIGS. 1–3 show sectioned views of a two-stage ejector with the different pairs of ejector plates and their actuating parts, in which:

FIG. 1 shows a starting position for extension of the two pairs of moving ejector plates;

FIG. 2 shows the final position for stage I after extension of the two pairs of plates together;

FIG. 3 shows the final position for stage II after continued extension of the front pair of plates;

FIGS. 4–6 show in detail the interaction between a segment and an actuating part and a pin groove respectively;

DETAILED DESCRIPTION OF THE INVENTION

Figure 1:
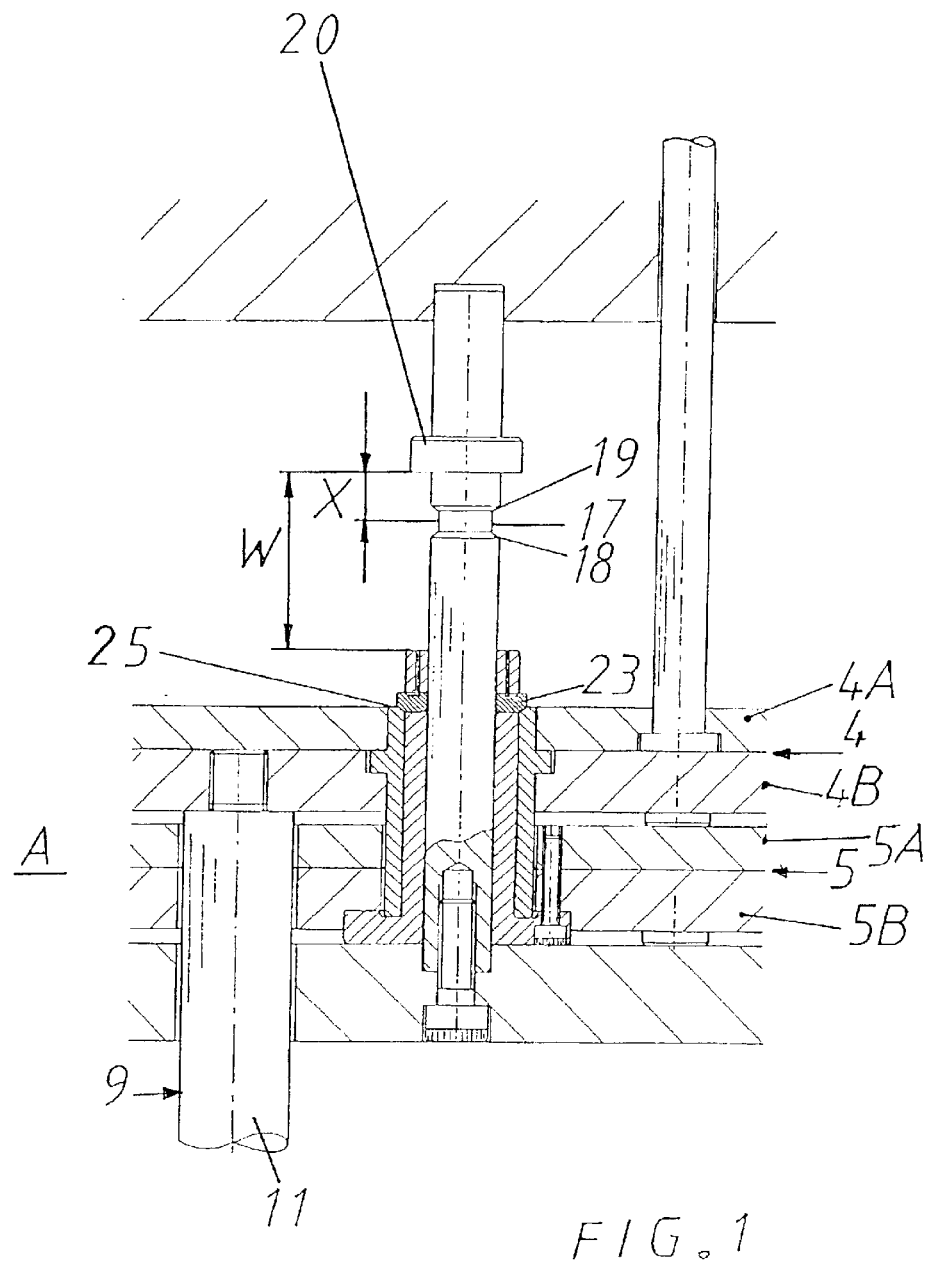
Figure 2:
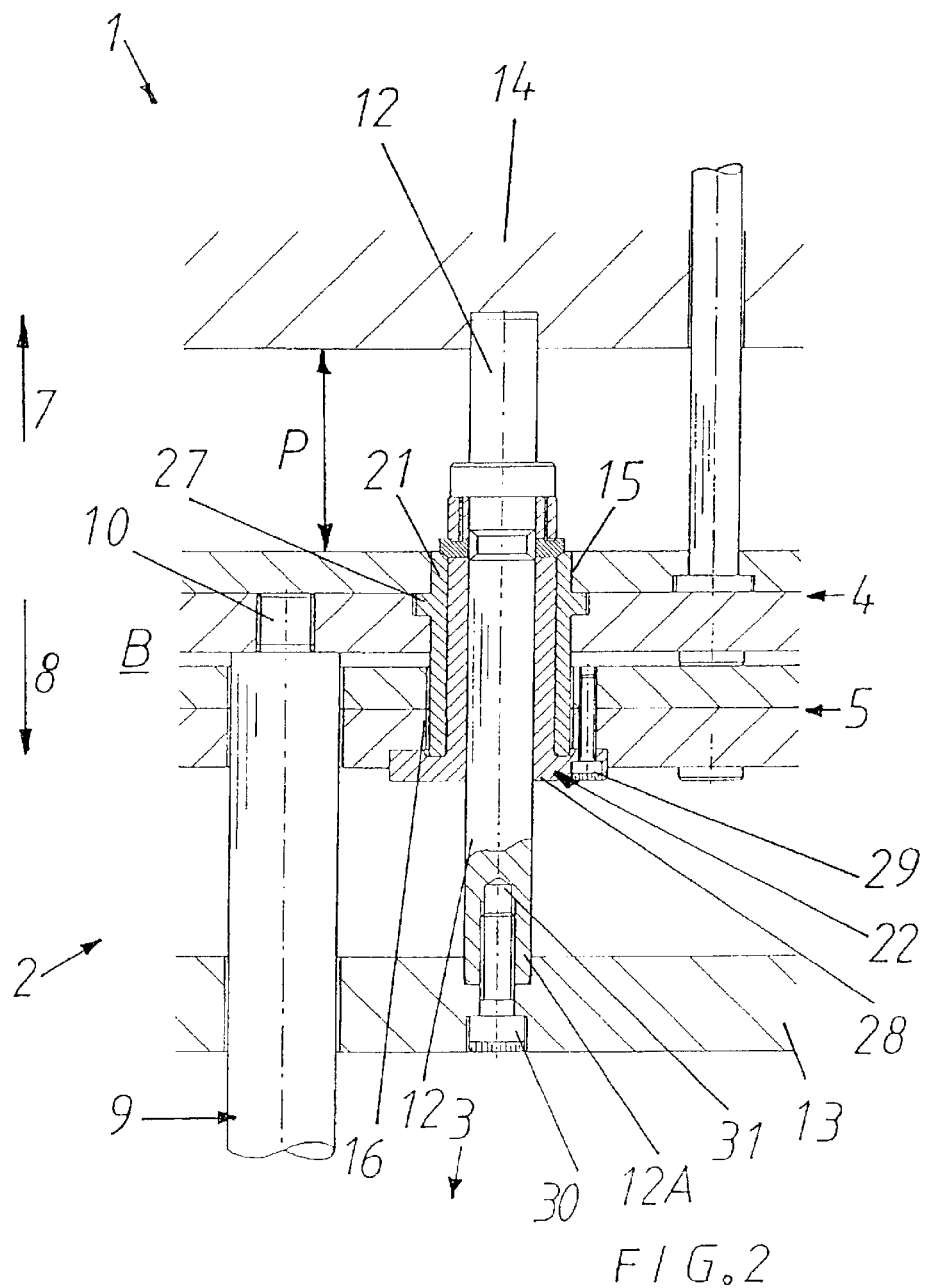

The arrangement in accordance with the invention is suitable for building into one or more desired positions for the extension of formed components on the side, preferably in pairs, or centrally positioned in the middle. The result is that a smooth bottom plate can be achieved on the tool, and that this replaces all the extra guides which previously had to be applied because balancing against misalignment of the ejector package with the plates is now obtained at the same time through the incorporation of the two-stage ejector.

An arrangement 1 for a continuous two-stage ejector 2, which is of the built-in type intended for moulding machines 3 and comprises pairs of moving ejector plates 4, 4A, 4B and 5, 5A, 5B and an actuating device 9 for actuating the aforementioned ejector plates 4, 4A, 4B and 5, 5A, 5B and causing them to be displaced to intended positions A, B, C, comprises in accordance with the present invention a special solution for actuation of the various components included in the construction. More specifically, the front ejector plates 4, 4A, 4B, which are preferably duplicated in a previously disclosed fashion in order to simplify their manufacture and assembly, are attached to and capable of actuation by a reciprocating 7, 8 rod 9, which is secured to the aforementioned front ejector plates 4, 4A, 4B with its threaded front part 10 and is connected to the machine 3 with its rear end part 11.

A central pin 12 extends between the fixed plate 13 of the moulding tool and the body 14 of the moulding tool through openings 15, 16 in the two plates 4, 5. This central pin 12 exhibits an annular groove 17 with inclined stop parts 18, 19 which is situated at a distance from a preferably annular fixed projection 20 on the aforementioned central pin 12. Pairs of sleeves 21, 22 are accommodated by the aforementioned central pin 12 with one sleeve 21 passed onto the second sleeve 22 and the pin 12 so that they are capable of being displaced relative to one another in axial directions 7, 8 jointly and separately along the central pin 12. The two sleeves 21, 22 are each attached with their rear moving ejector plates 4, 4A, 4B; 5, 5A, 5B.

The inner sleeve 22 in this case exhibits transcurrent recesses 24 corresponding to the desired number of locking segments 23, for example six in number, while the outer sleeve 21 exhibits a stop part 25 so arranged as to actuate the aforementioned locking segments 23 in conjunction with the displacement of the aforementioned outer sleeve 21 in an axial direction 7. The aforementioned locking segments 23 exhibit an inclined stop part 26 capable of interacting with the aforementioned groove 17.

The function of the arrangement 1 is thus as follows:

Extension of the first sleeve 22 is restricted by the projections 20, in conjunction with which the ejector 9 of the machine is so arranged in an initial phase as to actuate the front ejector plates 4, 4A, 4B, and so that the rear ejector plates 5, 5A, 5B are interconnected with the help of the locking segments 23, so that, after actuation of the locking segments 23 and their accommodation in the aforementioned annular groove 17, the rear ejector plates 5, 5A, 5B are released and the front ejector plates 4, 4A, 4B are so arranged as to be actuated singly by the ejector 9 causing them to be extended to the intended end position B.

Retraction of the plates 4, 4A, 4B; 5, 5A, 5B takes place in the reverse of the sequence indicated above.

The two sleeves 21, 22 are interconnected respectively with the pairs of front ejector plates 4, 4A, 4B and with the pairs of rear ejector plates 5, 5A, 5B, each by means of its own flange 27, 28, which are securely clamped between the pairs of plates 5A, 5B and are capable of being screwed securely in place by means of a screw 29. The length of stroke W for the front ejector plates 4, 4A, 4B is determined by the length of the aforementioned central pin 12, and by cutting the pin to the desired length at its rear end 12A, it is possible to determine the length of stroke W that it is wished to obtain with the arrangement 1. By means of a bolt 30 that is screwed into a threaded central hole 31 in the central pin 12, the rear end 12A of the central pin is secured to the fixed plate 13, i.e. the bottom plate of the moulding tool.

Figure 3:
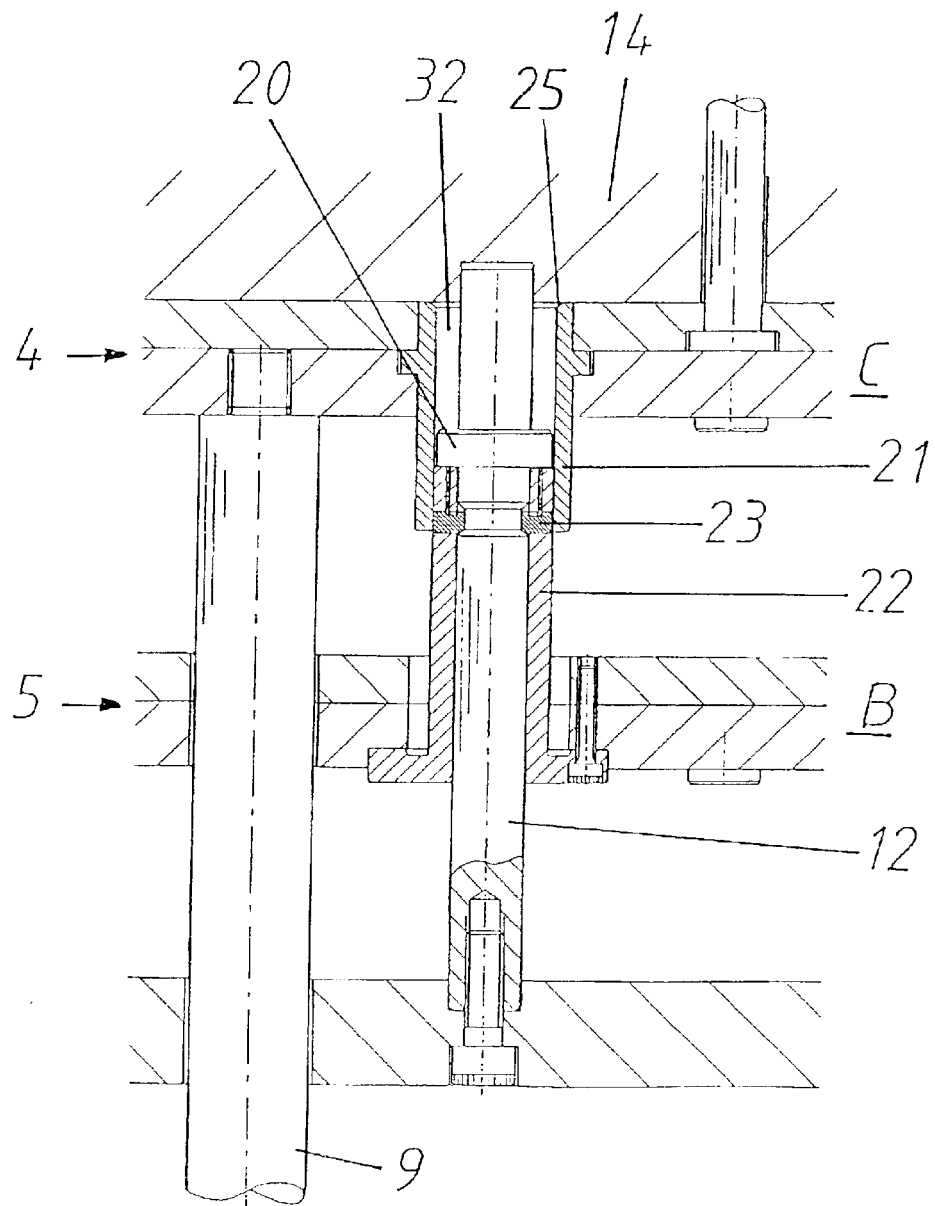

The aforementioned projection 20 on the central pin 12 can be formed by an annular fixed collar 1, the external diameter of which is essentially equivalent to the external diameter of the inner sleeve and the internal diameter of the outer sleeve, as clearly illustrated in FIG. 3. The aforementioned projection 20 is thus so arranged as to be accommodated in the internal space 32 of the outer sleeve 21 in its fully extended position C as shown in FIG. 3.

The aforementioned locking segments 23 exhibit mutually opposing inclined stop surfaces 26, 33, with which stop parts 25 and 18 inclined to a corresponding degree respectively in the aforementioned outer sieve 21 and in the annular groove 17 are capable of interacting in order, by so doing, to achieve radial displacement of the locking segments 23 respectively in a direction inwards 35 and in a direction outwards 36 after actuation and interaction when the inner sleeve 22 is displaced relative to the outer sleeve 21 and relative to the central pin 12.

In order to ensure that the locking segments 23 are retained in position in associated recesses 24 in the inner sleeve 22, so that they are not displaced too far and fall out of the aforementioned recesses 24, each of the locking segments 23 can exhibit its own axial, channel-shaped hollow 37, which extends radially for the desired distance for which it is wished for the locking segments 23 to be capable of being displaced without falling out of the aforementioned sleeve 22, and in which hollow 37 a pin 38 is capable of being accommodated in order to ensure the aforementioned retention of the locking segments 23.

The length of stroke P of the additional extending outer ejector plates 4, 4A, 4B is determined by the ejector 9 of the machine, although this distance must not exceed an indicated maximum value.

Figure 7:
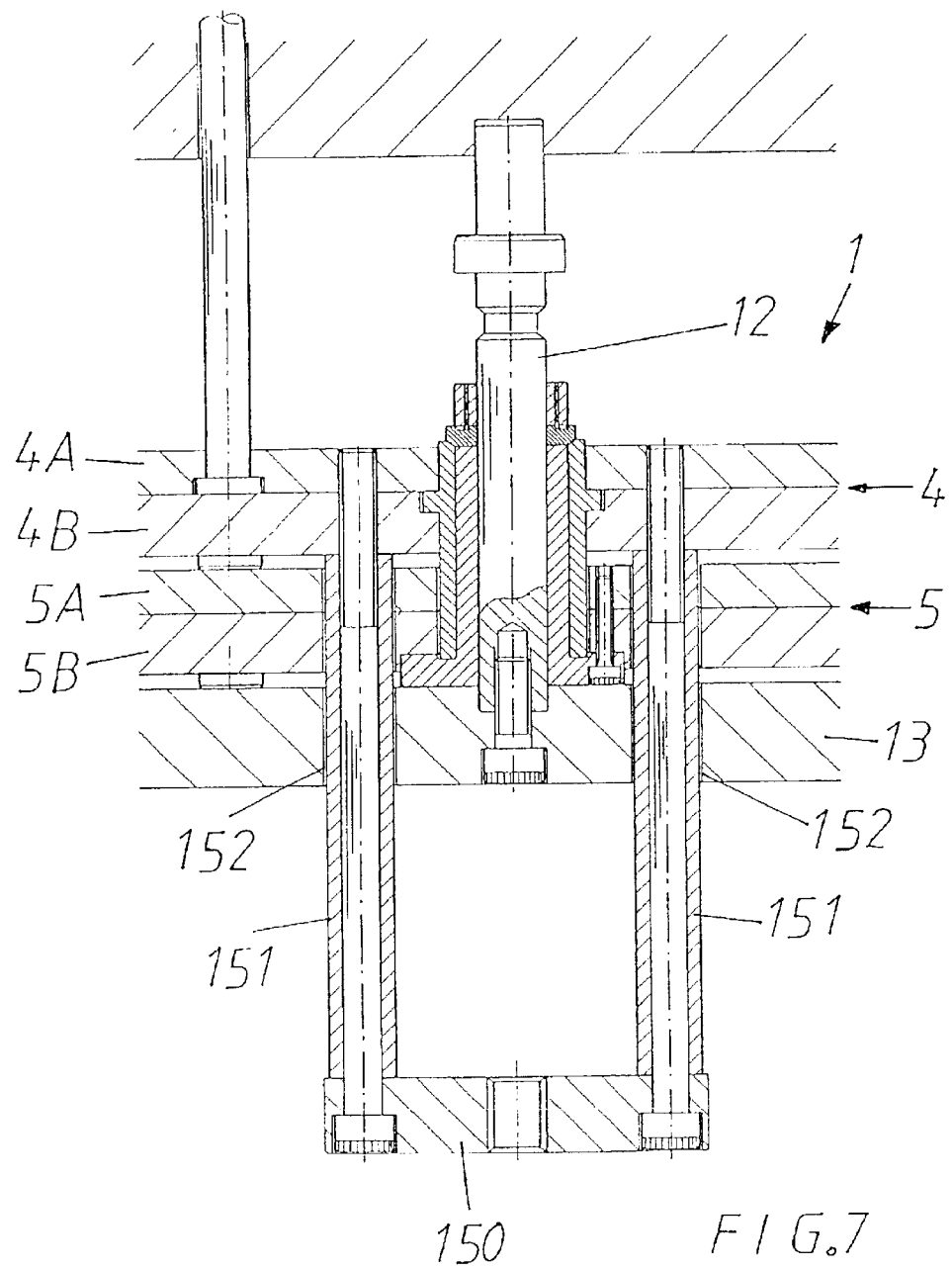
FIG. 7 shows a variant with an extra ejector plate.
Figure 8:
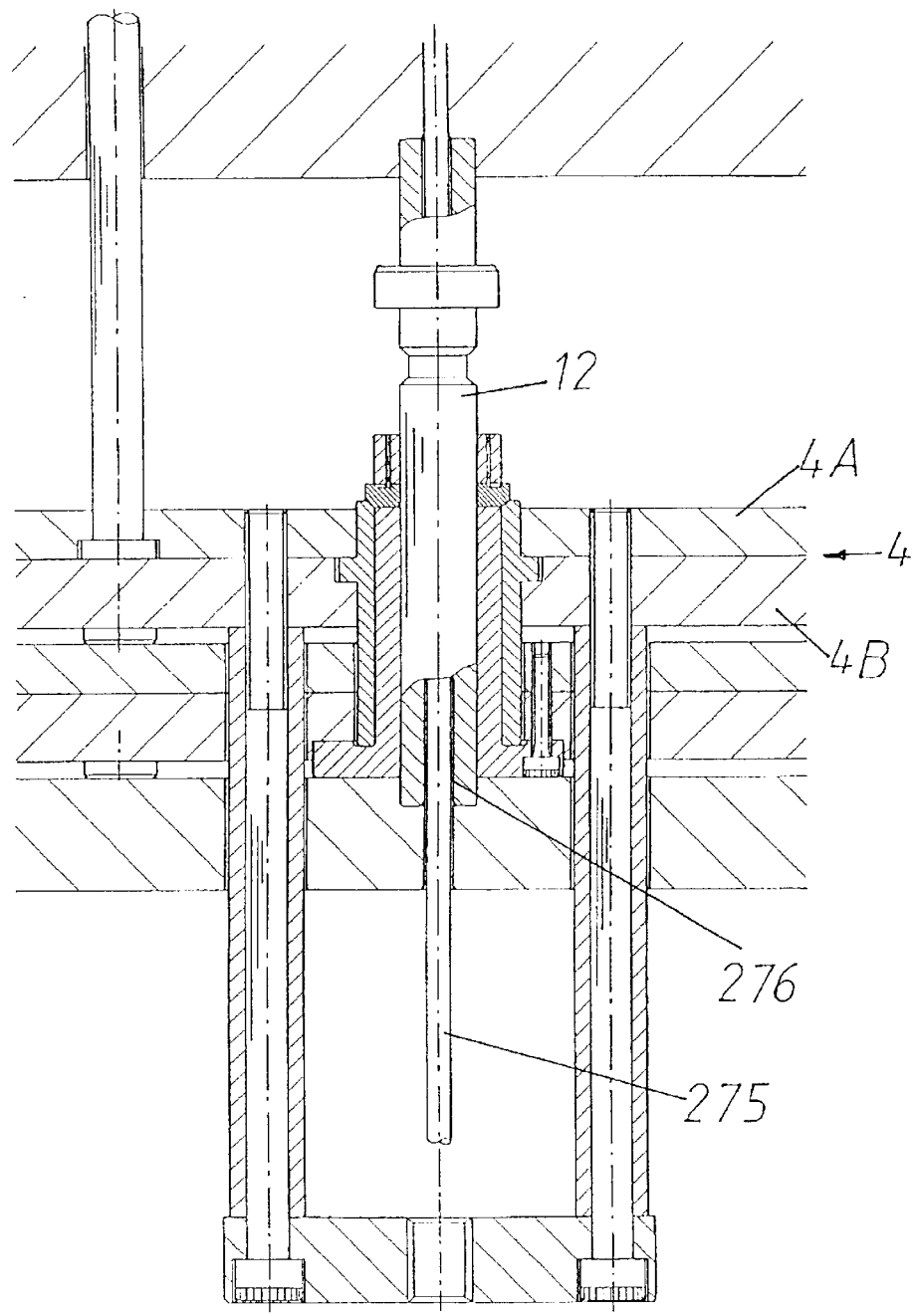
FIG. 8 shows a further variant with an ejector rod.

The arrangement 1 can thus, as shown in FIGS. 7 and 8, be built into the middle of the tool with the help of an extra ejector plate 150, which is supported by uprights 151 which pass into a central hole 152 in the bottom plate 13 of the moulding tool or one to either side of the tool. The latter method of incorporation permits an entirely smooth bottom to be obtained on the tool after removing the ejector pin at the centre.

In accordance with a further illustrative embodiment, an ejector rod 275 is so arranged as to extend through the central pin 12 into a central channel 276 in order to permit the extension of, for example, undercut components which are produced.

The function is identical, however, in accordance with the illustrative embodiments shown here. It is thus based on the ejector 9 of the machine actuating the front ejector plates 4, 4A, 4B, and the rear plates 5, 5A, 5B are forced to be conveyed along until the bearing locking segments 23 reach the accommodating groove 17 in the central pin 12, which also exhibits a stop 20 functioning as a stroke-restricting collar.

The function and the nature of the invention can be appreciated from the above description and the illustrations in the drawings.

The invention is naturally not restricted to the above description and the embodiments illustrated in the accompanying drawings. Modifications are possible, especially with regard to the nature of the various component parts, or by the use of equivalent technology, without departing from the area of protection afforded to the invention as defined in the Patent Claims.

What is claimed is:

1. Arrangement for a continuous two-stage ejector of the built-in type for moulding tools (3) comprising pairs of front and rear moving ejector plates and an actuating device (6) for causing the ejector plates to be moved to intended positions, comprising front ejector plates attached to, and capable of actuation by, a reciprocating rod that is connected to the machine, a central pin extending between the fixed plate of the moulding tool and a body of the moulding tool, the central pin exhibits an annular groove at a distance from a projection on the central pin, pairs of sleeves are accommodated by the central pin with one sleeve passed onto the other sleeve, each of the two sleeves is attached to its own moving ejector plate, an inner sleeve exhibits transcurrent recesses corresponding to the desired number of locking segments, the outer sleeve exhibits a stop part capable of actuating the locking segments, the locking segments exhibit stop parts capable of interacting with the groove, an extension of the first sleeve is restricted by the projection, in conjunction with which the ejector of the machine is so arranged in an initial phase as to actuate the front ejector plates and so that the rear ejector plates are conveyed along through the interconnection of the two sleeves with the help of the locking segments, and in that, after actuation of the locking segments and their accommodation in the annular groove, the rear ejector plates are released and the front ejector plates are so arranged as to be actuated singly by the ejector causing them to be extended to the intended end position, the two sleeves are interconnected respectively with the pairs of front ejector plates and with the pairs of rear ejector plates, each by means of its own flange, which is securely clamped and is capable of being screwed securely in place, and the projection on the central pin is formed by an annular collar, the external diameter of which is essentially equivalent to the external diameter of the inner sleeve and the internal diameter of the outer sleeve.

2. Arrangement in accordance with Patent claim 1, wherein the two sleeves are so arranged as to extend through a centrally located hole in the front and rear ejector plates.

3. Arrangement in accordance with Patent claim 1, wherein the length of stroke for the front ejector plates is determined by the length of the central pin.

4. Arrangement in accordance with Patent claim 1, wherein the projection is so arranged as to be accommodated in the internal space of the outer sleeve.

5. Arrangement in accordance with Patent claim 1, wherein the locking segments exhibit mutually opposing inclined stop surfaces, with which an inclined stop part in the outer sleeve and in the annular groove are capable of interacting for radial displacement of the locking segments respectively in a direction inwards and in a direction outwards.

6. Arrangement in accordance with Patent claim 1, further comprising pins wherein each of the locking segments exhibits its own axial hollow, each hollow adapted to accommodate one of said pins to ensure the retention of the locking segment in associated recesses in the inner sleeve.

7. Arrangement in accordance with Patent claim 1, further comprising an extra ejector plate connected to the plates at their center.

8. Arrangement in accordance with Patent claim 7, further comprising an ejector rod arranged as to extend through the central pin.

9. Arrangement in accordance with Patent claim 2, characterized in that the length of stroke for the front ejector plates is determined by the length of the aforementioned central pin.

* * * * *